United States Patent [19]

Jaisinghani et al.

[11] 4,385,986
[45] May 31, 1983

[54] GRAVITY SEPARATOR FOR SEPARATING LIQUIDS

[75] Inventors: Rajan A. Jaisinghani, Stoughton, Wis.; Gregory S. Sprenger, Greenville, Tenn.

[73] Assignee: Nelson Industries, Inc., Stoughton, Wis.

[21] Appl. No.: 252,020

[22] Filed: Apr. 8, 1981

[51] Int. Cl.³ .................................................. B01D 21/00
[52] U.S. Cl. ................................. 210/123; 210/521; 210/536; 210/538; 55/174
[58] Field of Search ................ 210/DIG. 5, 521, 522, 210/536, 532.1, 320, 538, 96.1, 123; 55/174, 206

[56] References Cited

U.S. PATENT DOCUMENTS

| | | | |
|---|---|---|---|
| 2,657,760 | 11/1953 | Glasgow | 55/174 |
| 3,385,031 | 5/1968 | McMinn | 55/174 |
| 4,132,651 | 1/1979 | de Jong | 210/522 |
| 4,202,778 | 5/1980 | Middelbeek | 210/522 |
| 4,257,895 | 3/1981 | Murdock | 210/521 |

FOREIGN PATENT DOCUMENTS

| | | | |
|---|---|---|---|
| 53-27169 | 3/1978 | Japan | 210/522 |
| 2035118 | 6/1980 | United Kingdom | 210/522 |

*Primary Examiner*—Benoit Castel
*Attorney, Agent, or Firm*—Andrus, Sceales, Starke & Sawall

[57] ABSTRACT

A gravity separator for separating two immiscible liquids of different specific gravities and particularly for separating oil from water. The separator is composed of a horizontal, generally cylindrical closed vessel and water is pumped into an inlet in the vessel, and clarified water is discharged through an outlet. In addition, an oil drain line is connected to the upper end of the vessel. Located within the vessel is a cylindrical assembly of generally parallel inclined separator plates. The assembly of separator plates is freely positioned within the vessel and means is provided to prevent rotation and axial movement of the plate assembly within the vessel. A liquid level sensor extends downwardly through aligned openings in the assembly plates, and when the oil level reaches a predetermined maximum depth, the sensor actuates a draining system to drain the oil from the vessel. To aid in preventing the water within the vessel from being discharged through the oil drain line, a baffle is located in spaced relation beneath the drain line.

2 Claims, 5 Drawing Figures

GRAVITY SEPARATOR FOR SEPARATING LIQUIDS

BACKGROUND OF THE INVENTION

Parallel inclined plate separators have been used in the past to separate immiscible liquids of different specific gravities, as for example, separating oil from water. As the water, containing oil and suspended solids, enters the separating vessel, the larger oil droplets will separate out from the water and rise to the top of the vessel, while the larger suspended solids will settle to the bottom of the vessel. After this initial separation phase, the water then flows through the inclined parallel plates and the shorter rise distance provided by the parallel plates permits small oil droplets to separate out from the water and collect on the surface of the plates. The angle of the parallel plates and the flow of the water permits the oil droplets to flow upwardly along the plates to the top of the vessel for collection.

In the past, the separating vessels utilizing inclined plates have usually been rectangular in configuration with open tops and it has been the practice to collect the oil in a separate oil collection zone at the top of the vessel, and the collected oil is overflowed through a weir to a collection container.

It has also been common practice in the past to pre-assemble the inclined separator plates as an assembly or pack, so that the entire pack can be removed from the separating vessel for routine maintenance or repair.

Although cylindrical vessels are generally cheaper to fabricate than rectangular units, cylindrical units have not been generally used in the past. This is primarily due to the increased complexity of a separator plate pack designed for a cylindrical vessel and the difficulty associated with oil collection and sensor operation for horizontal vessels. Horizontal vessels are desirable from a separation standpoint but problems arise in separation and removal of the oil layer in horizontally mounted vessels used in marine applications due to yawing and rolling of the ship.

SUMMARY OF THE INVENTION

The invention is directed to an improved gravity separator having particular application for separating oil from water. As a specific application, the separator can be use aboard ship for separating oil from bilge water.

In accordance with the invention, the separator includes a horizontally mounted, generally cylindrical closed vessel, and the oil-contaminated water is introduced into the lower end of the vessel. Located within the vessel is a generally cylindrical assembly of parallel inclined, separator plates. The assembly of separator plates is freely disposed within the vessel, and brackets attached to the vessel wall engage the plate assembly to prevent rotation of the assembly, as well as axial movement.

A capacitance-type liquid level sensor extends downwardly from the upper end of the vessel through aligned openings in the assembly of separator plates and is responsive to the depth of oil which has collected in the upper end of the vessel. When the oil depth has reached a predetermined maximum value, the sensor operates to open a drain line in the upper end of the vessel to permit the oil to be drained from the vessel.

To prevent water in the vessel from being discharged with the oil through the drain line, a baffle is positioned in alignment beneath the drain line. The baffle prevents the water beneath the oil layer from flowing directly into the drain line when the layer of oil is removed from the vessel.

The cylindrical vessel is preferably mounted in a horizontal manner and thus provides better separation efficiency than a vertically mounted vessel. When the separator is used board ship for separating oil from bilge water, the sensing mechanism is located at the longitudinal center of the separator vessel, at a position where fore-and-aft tilting or yawing of the vessel, will have a minimum affect on the accuracy of the sensing mechanism.

The closed cylindrical separator vessel is provided with an open end which is enclosed by a hinged sealed door. With this construction, the entire cylindrical assembly of separator plates can be readily inserted and removed from the open end of the vessel after opening the door, thereby facilitating cleaning and maintenance operations.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
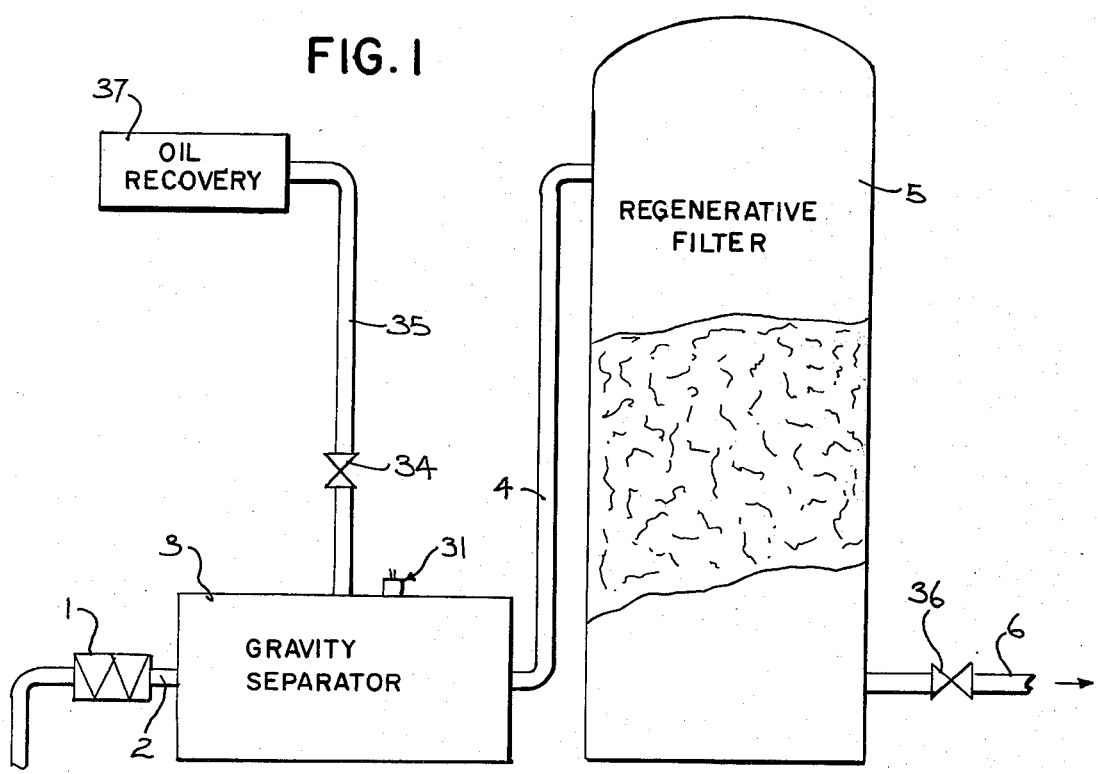
FIG. 1 is a schematic representation of an oil separating system incorporating the gravity oil separator of the invention.

FIG. 1 illustrates a system for separating two liquids of different specific gravities, such as oil and water, and has a particular application for separating oil and suspended solids from bilge water.

In the system as illustrated, the oil-contaminated water is pumped from the bilge, or other water holding tank, by a low-emulsifying pump 1, which can take the form of a progressive cavity, auger-type pump or a diaphragm-type pump, and is discharged through line 2 to a gravity separator 3. After separation of oil and suspended solids, the water is delivered from the separator through line 4 to a filter unit 5 where remaining quantities of oil and solids are removed from the water. The clarified water is then discharged from the filter unit through line 6 overboard, or to a water collection site.

Figure 2:
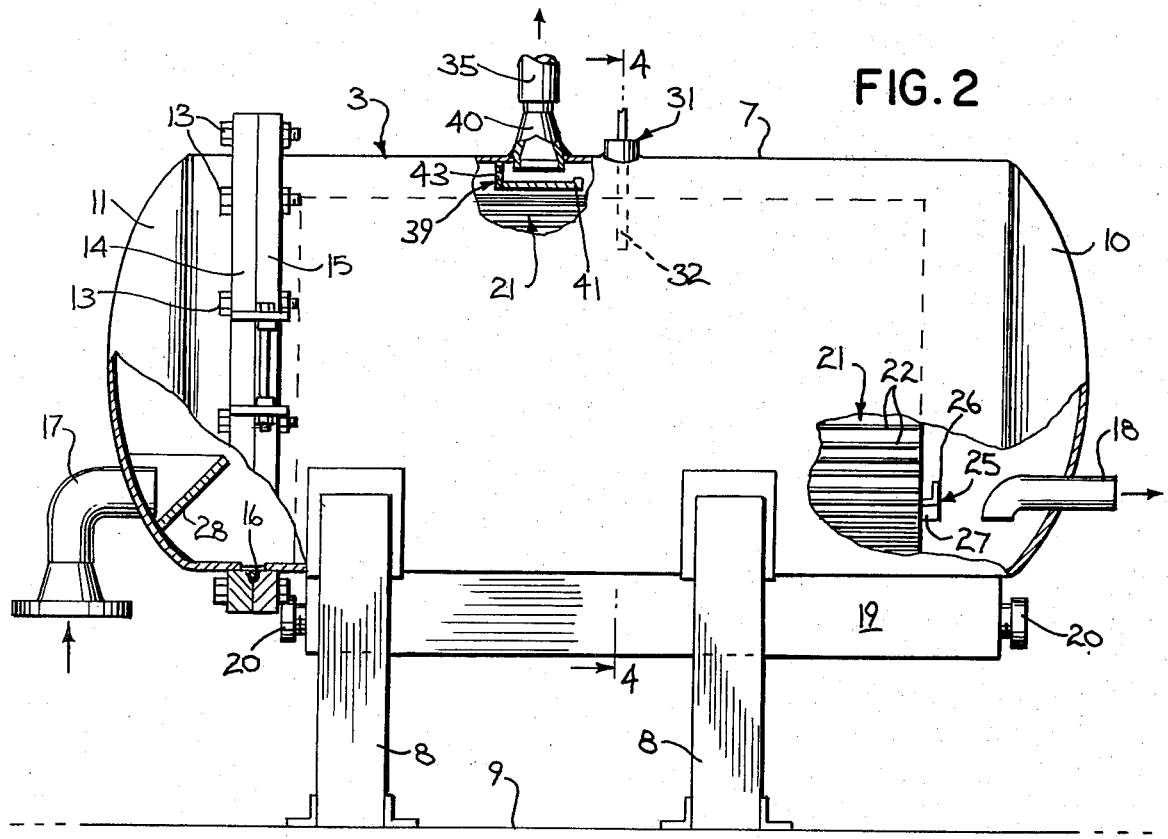
FIG. 2 is a side elevation of the separating vessel with parts broken away in section.
Figure 3:
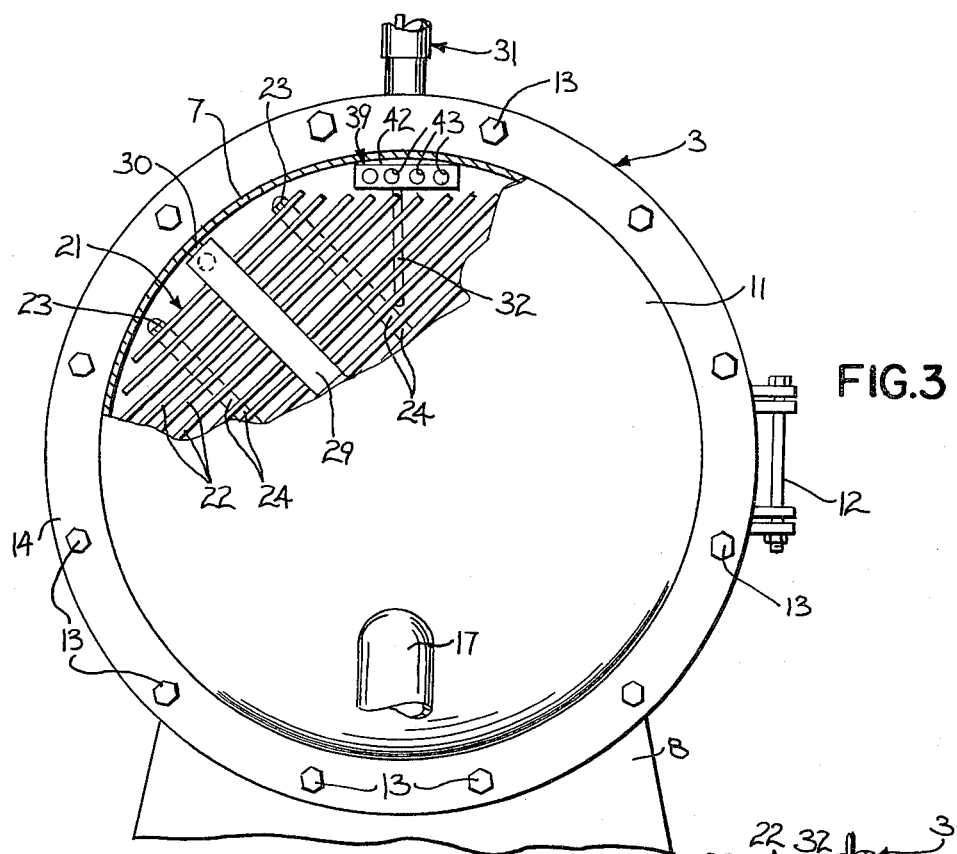
FIG. 3 is an end view of the vessel with parts broken away and showing the separator plates.

The separator 3 of the invention includes a generally cylindrical shell 7 which is supported by legs 8 from the foundation 9. A dome-shaped end head 10 is connected to one end of the shell, while a dome-shaped door or cover 11 is hinged to the opposite end of the shell by hinge 12. Cover 11 can be pivoted between open and closed positions, and can be locked in the closed position by bolts 13 which connect the mating flanges 14 and 15 on the cover and shell, respectively. As best shown in FIG. 2, a gasket 16 seals the joint between the mating flanges 14 and 15.

The oil-contaminated water is delivered through line 2 to an inlet pipe 17 which is connected to the lower portion of cover 11, and the clarified water is discharged from the separator through outlet pipe 18 to line 4. Suspended solids which settle within the vessel can be collected in the sump or trough 19, and ends of trough 19 are provided with openings that are normally enclosed by caps 20. To clean the sludge from trough 19, one or both of the caps 20 can be removed and an elongated implement can be inserted within one of the openings to scrape the sludge from the trough. Alternately, a high pressure stream of water or other liquid can be introduced into the trough to flush out the sludge.

Figure 4:
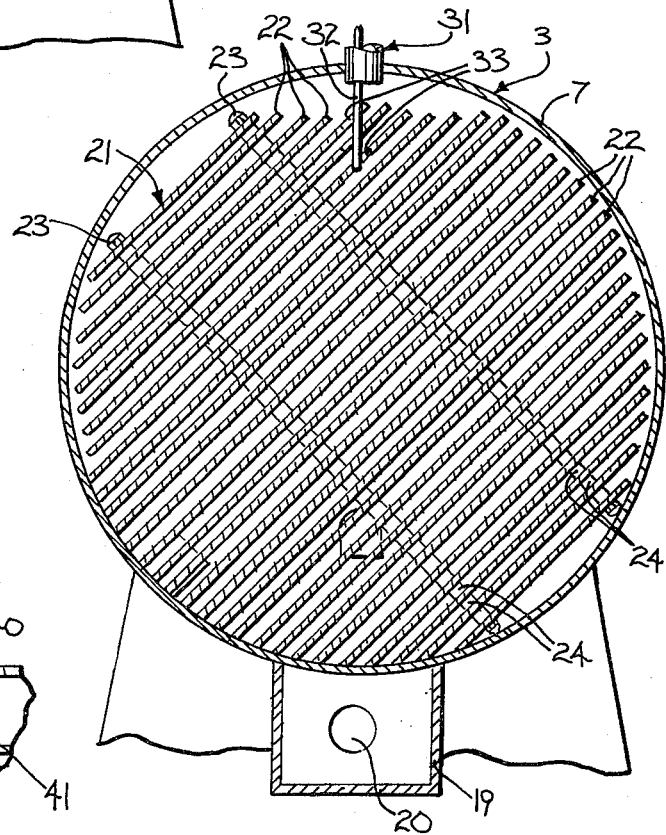
FIG. 4 is a section taken along line 3—3 of FIG. 2.

In accordance with the invention, a cylindrical plate assembly 21 is located within the shell 8, and the assembly includes a series of parallel inclined plates 22. Each of the plates 22 has a generally rectangular configuration, and the plates are arranged, as illustrated in FIG. 4, in a generally cylindrical configuration which conforms to the interior of the shell 7.

Tie rods 23 connect the plates 22 together, and plastic tubular spacers 24 are disposed around the tie rods 23 and are interposed between adjacent plates.

The cylindrical plate assembly 21 is freely mounted within the shell 7, and the inner end of the assembly engages a generally L-shaped bracket 25 which is mounted on the inner wall of the shell. As best shown in FIG. 2, the ends of several of the plates 22 can bear against the leg 26 of the bracket, while the other leg 27 of the bracket is positioned within two adjacent plates and prevents rotation of the assembly 21 within the shell 7.

A baffle 28 is secured to the door 11 in alignment with the inlet 17 and serves to direct the incoming oil-contaminated water upwardly into the plate assembly 21. The baffle 28 provides more uniform flow of the liquid through the plate assembly and prevents the incoming liquid from being jetted directly into the lower portion of the plate assembly.

Figure 5:
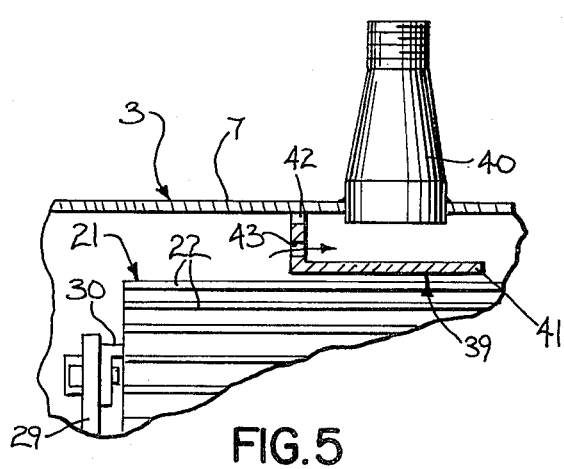
FIG. 5 is a fragmentary enlarged section showing the attachment of the separator plates and the trough.

To limit axial movement of the plate assembly 21 in a direction toward the cover 11, a bar 29 is bolted to brackets 30 that are attached to the shell 7 at diametrically opposite locations, and the bar 29 is disposed adjacent the end of the plate assembly, as shown in FIG. 5.

The separator of the invention can incorporate a mechanism for automatically draining the accumulated oil from the vessel. As shown in the drawings, a liquid level sensing assembly 31 is mounted within an opening in the upper end of the shell and the sensing assembly includes a probe 32 that extends downwardly through aligned openings 33 in the separator plates 22, as illustrated in FIG. 4. The probe can be a capacitance type sensor in which the capacitance varies with the depth of oil accumulated in the tank. When the oil accumulates to a predetermined or set depth, the probe 32 will act to open a valve 34 in oil drain line 35 and close valve 36 in the water discharge line. With the water line valve 36 closed and the oil drain line valve 35 open, the low pressure pump 1, acting against the heavy viscous oil, will develop an increased pressure sufficient to deliver the viscous oil sludge through line 35 to an oil recovery tank 37. When the depth of oil in the separator vessel recedes to a minimum level, the probe 32 will operate to close the valve 34 in line 35 and open valve 36 in the water line to restore normal operation.

The oil sensing system can also operate with a timer. In this case, when the oil has collected to a preset depth, the sensing probe will operate to open the oil drain valve 34 and close the valve 36 in the water flow line and the valves will remain in this condition for a given time period, sufficient to drain the major portion of the collected oil.

To prevent the water beneath the collected oil layer from being discharged through the drain line 36 with the oil, baffle 39 is mounted on the inner surface of shell 8 beneath the outlet 40 in oil drain line 35. The baffle includes a central portion 41 and an end wall 42 having a plurality of holes 43. The baffle prevents the vortex at outlet 40 from pulling water into the oil drain and minimizes the direct flow of water to the drain line when the valve 34 is opened and the pump 1 is operated.

If the separator is to be used board ship, the oil drain outlet 40 and sensor 31 are located approximately at the longitudinal center of the separator vessel 3 and in this location, the affects of fore and aft yawing of the separator vessel due to motion of the ship is minimized. Yawing results in tilting of the oil level in the separator vessel and by locating the sensor 31 at the longitudinal mid-point of the separator vessel, excessive oil build-up at one end of the separator is prevented.

In operation, as the oil-contaminated water is pumped into the vessel through the inlet 17, the larger oil droplets will rise to the top of the vessel 7, while the solid particles will settle to the bottom and flow along the bottom for collection in the sump 19. The flow of water through the inclined parallel plates 22 permits the smaller dispersed oil droplets to separate from the water and collect on the undersurface of the plates. The angle of the plates, approximately 45° to the horizontal, along with the flow of water through the vessel, permits the film of oil droplets to rise upwardly for collection at the top of the vessel.

As previously noted, when the oil level accumulates to a given depth, the sensor 31 will operate to open the valve 34 in the oil drain line 35 and open valve 36 in the water line 6 to permit the pump 1 to discharge the collected oil through the drain line to the oil recovery tank 37.

The cylindrical configuration of the vessel 1 is a less expensive construction than a rectangular-type vessel. As the diameter of the cylindrical plate assembly 21, as best shown in FIG. 4, is only slightly less than the internal diameter of the vessel, substantially the entire volumetric capacity of the vessel can be used for separator plates, and this greatly increases the efficiency of separation over conventional separators.

In addition, the special mounting arrangement of the sensor 31 in the center of the vessel with the baffle plate 39 allows use of the full vessel for oil collection without problems due to tilting or water flow through the oil drain. Further, this is accomplished without the use of an additional collection zone.

While the drawings have shown the separator of the invention used in a pressurized system, in which the separator 3 is located on the discharge side of the pump 1, it is contemplated that in certain installations the separator can be located on the suction side of the pump. Furthermore, the accumulated layer of oil can be removed from the separator by a gravity overflow as opposed to the positive draining mechanism, shown in the drawings.

While the above description has shown the separation of a lighter weight liquid, such as oil, from a heavier weight liquid, such as water, it is contemplated that the system can be used to separate a heavy liquid from the flow of a light liquid by positioning the drain outlet 40 in the lower end of the separating vessel 3. In addition, the system can be used in connection with mixtures of three liquids having different specific gravities, with the light and heavy liquids being drained from the upper and lower ends of the separator vessel, respectively, and the liquid of intermediate specific gravity passing through the vessel.

Various modes of carrying out the invention are contemplated as being within the scope of the following claims particularly pointing out and distinctly claiming the subject matter which is regarded as the invention.

We claim:

1. An apparatus for separating liquids of different specific gravities, comprising a cylindrical vessel having an inlet and having an outlet, means to introduce a mixture of a first heavier liquid and a second lighter liquid to said inlet, a generally cylindrical assembly of spaced generally parallel inclined separator plates removably disposed within the vessel for separating said lighter liquid from the heavier liquid, said plates being inclined to the horizontal and said plates being disposed generally parallel to a longitudinal plane extending along the axis of the cylindrical vessel, the diameter of said cylindrical assembly being slightly less than the internal diameter of said vessel, each of said plates being generally rectangular in shape, said plates having substantially the same length and having different widths to provide the cylindrical configuration for said plate assembly, one of said liquids being collected as a layer in a portion of said vessel and the other of said liquids being discharged from said vessel through said outlet, drain means connected to said portion of the vessel for draining said collected layer, a baffle disposed in spaced alignment with said drain means to prevent the other of said liquids from being discharged through said drain means, valve means disposed to open and close said drain means, and liquid level sensing means disposed in the vessel and responsive to a given depth of said collected layer to open said valve means and drain said collected layer from the vessel, said liquid level sensing means comprising a probe, said separator plates being provided with aligned openings and said probe extending within said aligned openings.

2. The apparatus of claim 1, and including a deflector disposed within the vessel in alignment with the inlet for deflecting the incoming mixture upwardly toward the upper portion of said cylindrical plate assembly.

* * * * *